United States Patent [19]
Wiser

[11] Patent Number: 4,643,222
[45] Date of Patent: Feb. 17, 1987

[54] CHECK VALVE

[75] Inventor: David Wiser, Austin, Tex.

[73] Assignee: Chatleff Controls, Inc., Austin, Tex.

[21] Appl. No.: 724,347

[22] Filed: Apr. 17, 1985

[51] Int. Cl.$^4$ .............................................. F16K 15/02
[52] U.S. Cl. ................................ 137/528; 137/533.17; 251/357
[58] Field of Search ............... 251/332, 333, 334, 357; 137/528, 533, 533.17, 540

[56] References Cited

U.S. PATENT DOCUMENTS

| | | | |
|---|---|---|---|
| 1,443,675 | 1/1923 | Bowler | 137/540 |
| 2,163,472 | 6/1939 | Shimer | 251/357 X |
| 2,718,373 | 9/1955 | Henry | 251/357 |
| 2,949,928 | 8/1960 | Hobson | 251/333 X |
| 3,029,835 | 4/1962 | Biello | 251/357 X |
| 3,085,783 | 4/1963 | Pulling | 251/332 X |
| 3,097,666 | 7/1963 | Antrim | 251/357 X |

FOREIGN PATENT DOCUMENTS 1128240  4/1962  Fed. Rep. of Germany ...... 251/357

*Primary Examiner*—Robert G. Nilson
*Attorney, Agent, or Firm*—Arnold, White & Durkee

[57] ABSTRACT

An improved piston in a check valve which prevents unintentional leakage past the check valve even at low pressures. The piston includes a generally-conically shaped tip and a Teflon ring received in a groove circumscribing the tip. The valve includes first and second passageways with an annular, generally conical seat therebetween. The piston is slidably received in the second passageway such that with fluid pressure applied towards the seat, the ring abuts the seat. The proximal portion of the tip adjacent the ring is inwardly relieved such that the outermost region of the ring is unsupported. When even a low pressure is applied, the ring contacts the seat and flexes or bends towards the relieved proximal portion to provide an effective low pressure seal between the ring and seat.

11 Claims, 6 Drawing Figures

CHECK VALVE

BACKGROUND OF THE INVENTION

1. Field of the Invention

This invention relates to an improved check valve which prevents unintentional fluid leakage past the valve even at low fluid pressures. More particularly, it relates to a piston in such a check valve which supports an annular seal in such a manner that the seal bends when contacting an annular seat.

2. Description of the Prior Art

Generally speaking, check valves are well known. In this context, a check valve is taken as being any device which permits fluid flow in one direction while inhibiting fluid flow in the reverse direction. In many situations an ideal check valve would permit free flow of the fluid in the one direction while preventing all undesired fluid flow in the reverse direction. A typical check valve incorporates an enlarged chamber having a movable member (e.g. piston, ball, etc.) therein and a seat at one end of the chamber. Reverse fluid flow biases the movable member towards the seat, with the contact between the member and seat providing a seal which inhibits reverse fluid flow.

In such a check valve system, it takes a certain threshold of reverse fluid pressure to effectively bias the member into sealing disposition with the seat. Further, a small amount of reverse fluid flow can occur until the movable member is biased towards the seat. A common characteristic of such check valves is that the higher the reverse fluid pressure, the better the seal between the movable member and the seat. Many types of check valves are ineffective in preventing undesired reverse fluid flow at low fluid pressures.

Check valves or expansion devices for use in refrigerant systems are generally illustrated by U.S. Pat. Nos. 3,877,248; 3,642,030; and 3,992,898, which are incorporated herein by reference. FIG. 2 of U.S. Pat. No. 3,992,898 illustrates a check valve for use in a reversible heat pump system. In such a heat pump valve, it is desirable to permit fluid flow in either direction, with a large amount of fluid flow permitted in the first direction, and a relatively small, metered fluid flow permitted in the reverse direction. In refrigerant systems, it is desirable that check valves prevent unwanted fluid flow even at low fluid pressures. For example, viewing FIG. 2 of U.S. Pat. No. 3,992,898, even though it is desirable to permit fluid flow in a reverse direction through the central metering port 46, it is nevertheless desirable to prevent reverse fluid leakage around the perimeter of the sliding piston 45. Those well versed in refrigerant systems will appreciate that often times the reverse fluid pressure is relatively low, but nevertheless it is important to allow only the metered amount of fluid to pass the valve through the metering port.

FIG. 4 illustrates a typical check valve in a refrigerant system which is designed to prevent fluid flow in the reverse direction (upwardly viewing FIG. 4) while permitting fluid flow in a first direction (downwardly viewing FIG. 4). It will be appreciated that in heat pump type systems, a centrally located metering port might be incorporated in the piston of FIG. 4 to allow a small, metered amount of reverse fluid flow. Viewing FIG. 4, the seal which prevents reverse fluid flow is provided by the compression of the gasket G contacting the annular seat S of the check valve. That is, the reverse fluid pressure biases the piston P in the reverse (upwardly) direction whereupon the gasket G compressingly engages seat S. The gasket G is typically a teflon ring which is stretched over the piston P during assembly. Often there are minor imperfections in the thickness of the gasket G and also minor installation errors can occur during assembly. The result is slight fluid leakage in the reverse direction past the gasket until the fluid pressure is high enough to compress and deform the gasket G against the seat S.

FIG. 6 illustrates typical test results of the leakage past the check valve illustrated in FIG. 4. The abscissa of the graph of FIG. 6 represents the reverse fluid pressure applied through the valve of FIG. 4 while the ordinate of the graph represents the amount of fluid leakage past the piston P. As can be seen from FIG. 6, little leakage past the gasket G occurs at relatively high fluid differential pressures (e.g., greater than 80 psig). However, a significant amount of fluid leakage past the gasket G occurs at low fluid pressures. In refrigerant systems, such reverse fluid leakage is undesirable and leads to inefficient operation of the system.

SUMMARY OF THE INVENTION

The problems outlined above are in large measure solved by the check valve of the present invention. The present check valve is designed to efficiently inhibit undesired reverse fluid flow even at low fluid pressures. To this end, the improved check valve hereof incorporates a slidable piston carrying a deformable seal. The seal is supported in such a manner to flex or bend upon contact with an annular seat in the check valve. The flexing contact of the seal at the low fluid pressures effectively prevents fluid leakage around the seal. The flexing contact of the seal with the valve seat prevents fluid leakage at much lower fluid pressures than required to compress the gasket of prior art valves.

Broadly speaking, the check valve hereof includes a slidable piston having a tip adapted for disposition towards a check valve seat. The tip includes an annular circumscribing groove, a distal portion on one side of the groove and a proximal portion on the other side of the groove. An annular ring or seal is operably received in the groove with the groove supporting the inboard region of the seal while the outboard region of the seal extends beyond the groove defining structure. The seal and piston cooperatively operate such that with fluid pressure applied towards the seat, the outboard region of the seal bends upon contact with the seat towards the proximal portion of the tip.

In preferred forms, the distal portion of the tip is frustro-conically shaped at about a 45° angle while the proximal portion of the tip presents a beveled outer surface angled relative to the centerline of the piston at about 60°. The proximal portion of the tip adjacent the seal is inwardly relieved in such a manner that the outboard region of the seal is unsupported.

DESCRIPTION OF THE PREFERRED EMBODIMENTS

Figure 1:
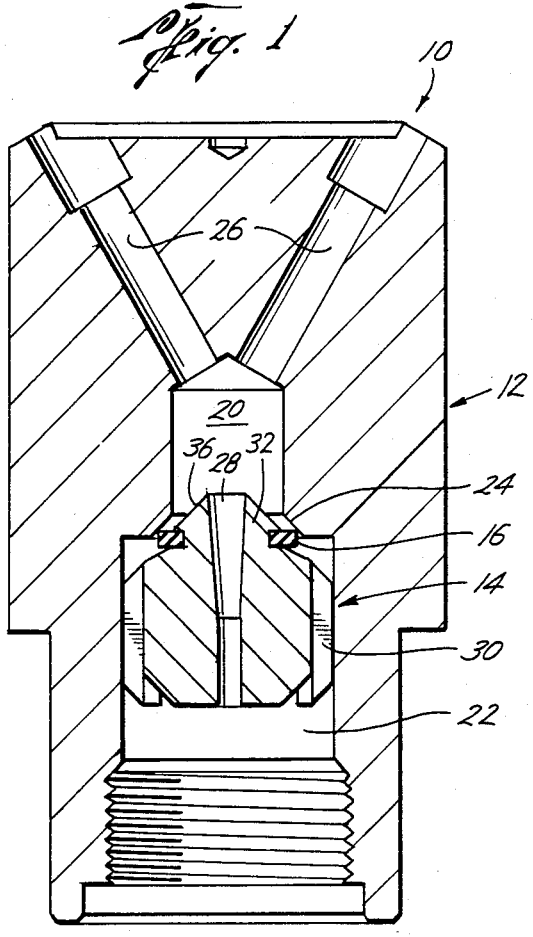
FIG. 1 is a vertical sectional view of the check valve of the present invention.

Turning now to the drawing, check valve 10 in accordance with the present invention broadly includes an elongated, generally cylindrical body 12, a piston 14 slidably received within the body 12, and seal means 16 coupled to the piston 14. The cylindrical body 12 includes a cylindrically shaped first passageway 20, coaxially aligned with an enlarged, cylindrically shaped second passageway 22. As shown in FIG. 1, the passageways 20, 22 are separated by a frustro-conically shaped seat 24. The first passageway 20 is in operable communication with a plurality of distributor tubes 26, while the second passageway 22 incorporates threads for coupling to another portion of the refrigerant system. It will be appreciated that when the check valve 10 is incorporated in a reversible, heat pump type system, the valve 10 can operate as an expansion device with the passageway 22 coupled to a similar expansion device oppositely oriented in relation to the fluid flow.

The elongated piston 14 is generally cylindrically shaped and includes a plurality of axially aligned flutes 30 circumferentially spaced along the periphery of the piston. The piston 14 incorporates a generally frustro-conically shaped tip 32, with the piston 14 received in the passageway 22 such that the tip 32 is disposed towards the seat 24. As illustrated in FIG. 1, the piston 14 incorporates an elongated, tapered, metering orifice 28 extending coaxially through the piston which permits a metered amount of reverse fluid flow. It is, however, understood that in alternative embodiments the orifice 28 is excluded and a simple one-way check valve contemplated.

The tip 32 includes a structure defining an annular circumscribing groove 34, a distal portion 36 on one side of the groove 34, and a proximal portion 38 on the other side of the groove 34. The distal portion 36 is preferably frustro-conical with the outermost surface angled at approximately 45° relative to the axial centerline of the piston 14 (see FIG. 3).

Figure 3:
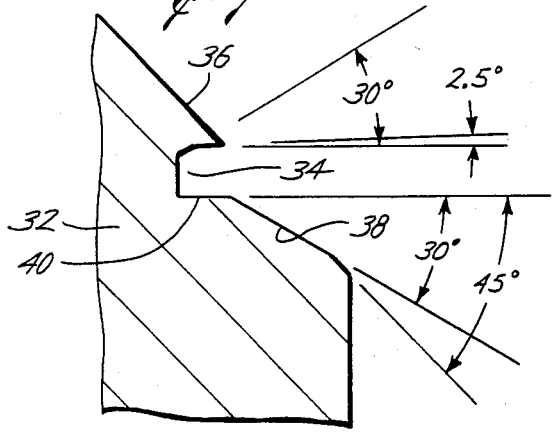
FIG. 3 is an enlarged, fragmentary, sectional view of a portion of the piston of the present invention.

The groove defining structure 34 includes a generally flat support surface 40 oriented normal to the piston centerline as in FIG. 3. The proximal portion 38 is inwardly relieved to adjoin the support surface 40 and presents an annular, frustro-conical shape as depicted. By "relieved," it is meant that part of the outermost oblique surface of the proximal portion 38 is radially inwardly recessed from an extension of the frustro-conical outermost surface of the distal portion 36 (see FIG. 3). As can be appreciated from FIG. 3, the included angle between the centerline of the piston 14 and the outermost oblique surface of the proximal portion 38 is approximately a 60° angle.

Figure 2:
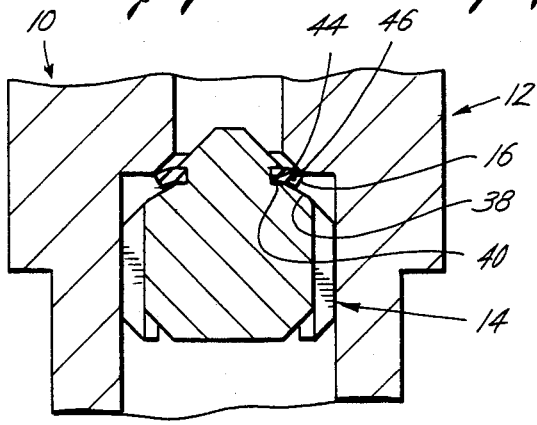
FIG. 2 is a fragmentary, schematic, sectional view of the valve of FIG. 1 and illustrates the flexing or bending of the seal under fluid pressure.

The seal means 16 is preferably an annular, compressible, flexible ring of a tetrofluoroethylene (Teflon) type material. The seal 16 is integral and includes an inboard region 44 and an outboard region 46 as illustrated in FIG. 2. The support surface 40 is of a certain width complementally dimensioned similar to the width of the inboard region 44. Thus, the support surface 40 fully supports inboard region 44 on one side (adjacent the proximal portion 38) of the seal 16. As shown in FIG. 1, the outboard region 46 is not supported by the groove defining structure 34.

In use, check valve 10 of the present invention allows fluid flow in one direction (downwardly in the drawing) by passage of the fluid around the flutes 30 of the piston 14. When fluid pressure is applied in a reverse direction (upwardly in the drawing), the piston 14 slidingly shifts as shown in FIG. 1 with the tip 32 disposed towards the first passageway 20.

In the preferred embodiment, it is desirable to prevent fluid passage around the piston 14 when reverse fluid pressure is applied. When the reverse fluid pressure is applied, the piston 14 slides until the seal 16 engages the seat 24 (FIG. 1). A small, metered amount of reverse fluid flow is permitted through the orifice 28. As reverse fluid pressure is applied, the outboard region 46 is biased by the seat 24 such that the seal 16 bends as shown in FIG. 2. The inboard region 44 is supported by the surface 40, while the outboard region 46 is unsupported. This allows the initial flexing or bending movement of the seal 16 as illustrated in FIG. 2. As reverse fluid pressure continues, the outboard region 46 is bent until it engages the outermost, oblique surface of the proximal portion 38. A further increase in the reverse fluid pressure compesses the Teflon seal 16.

Figure 4:
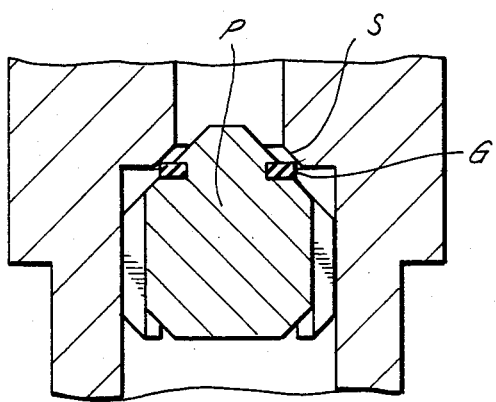
FIG. 4 illustrates a prior art check valve.
Figure 6:
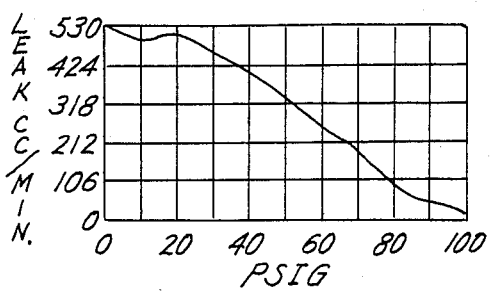
FIG. 6 is a graph similar to FIG. 5, but illustrates fluid leakage past the prior art check valve of FIG. 4 at different fluid pressures.

FIG. 4 illustrates a prior art check valve. In the prior art, it was commonly thought that the sealing action caused by the compression of the Teflon gasket G against the seat S was sufficient. However, as a comparison of the graphs of FIGS. 4 and 6 illustrates, a marked difference exists between the sealing performance of a prior art check valve and the check valve 10 of the present invention. When reverse fluid pressure is applied against a prior art check valve (FIG. 6) reverse fluid leakage past the piston P exceeds 212 cubic centimeters per minute at reverse fluid pressures less than 60 psig. As FIG. 6 illustrates, at higher fluid pressures, compression of the teflon gasket G begins to occur and reverse fluid leakage decreases significantly. At low fluid pressures, such as might be encountered in many types of refrigerant systems, including reversible heat pump refrigerant systems, reverse fluid leakage can be significant, with the attendant degradation in performance of the refrigerant system.

Figure 5:
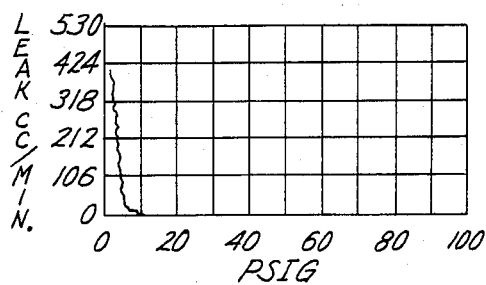
FIG. 5 is a graph showing fluid leakage past a check valve of the present invention at different fluid pressures.

In contrast, typical measurements of reverse fluid leakage past a check valve 10 in accordance with the present invention (without the metering orifice 28) reveals little fluid leakage past the valve 10 at practically all reverse fluid pressures. As illustrated in FIG. 5, at reverse fluid pressures exceeding 5 to 10 psig, reverse fluid leakage is practically nil. Thus, even at very low reverse fluid pressures, the check valve 10 of the present invention operates to prevent undesirable reverse fluid leakage.

In many applications, it is desirable to permit a small, metered, amount of fluid flow in the reverse direction when the reverse fluid pressure is imposed. To this end, check valve 10 incorporates an elongated metering orifice 28 extending coaxially through the piston 14. The metering port is dimensioned to allow a known amount of reverse fluid flow. It is desirable that the reverse fluid flow occur through the metering orifice 28 and not between the seat 24 and seal 16. Of course, the check valve 10 of the present invention operates to prevent most fluid leakage from occurring between the seat 24 and seal 16, even at low pressures.

Alternatively, it is often desirable to prevent any fluid flow in the reverse direction past the piston 14. For example, it may be desirable to use the check valve 10 as a simple one-way check valve, in which case the orifice 28 is omitted. Similarly, design considerations may dictate that the check valve 10 be a simple one-way device with a parallel reverse fluid flow path provided to branch around the valve 10. In any event, the present invention operates to prevent undesirable leakage between the seat 24 and seal 16.

What is claimed is:

1. A check valve operable for providing a seal against a seat disposed at the end of a passageway, the check valve comprising:
   piston means adapted for sliding reception within the passageway and having a tip adapted for disposition towards said seat, the tip including
   structure defining a circumscribing groove,
   a distal portion on one side of the groove, and
   a proximal portion on the other side of the groove having a seal support surface radially outwardly inclined away from the groove; and
   seal means operably received in the groove and including an inboard region and an outboard region, said groove defining structure providing support to the inboard region with the outboard region extending beyond the groove defining structure,
   the distal portion and proximal portion being dimensioned relative to the seat such that with the piston received within the passageway and biased towards said seat, the distal portion will not contact the seat, the proximal portion seal support surface being nonaligned in an outwardly converging orientation relative the seat,
   the seal means and piston means being operable when disposed in said passageway with relatively low fluid pressure applied towards the seat to bend the outboard region towards said proximal portion when the seal means contacts the seat to cause an initial flexing seal between the seat and outboard region of the seal means, increasing fluid pressure towards the seat causing subsequent compression of the outboard region of the seal means between the seat and proximal portion.

2. The check valve in accordance with claim 1, said seat and said proximal portion of said tip being generally frustroconically shaped.

3. The check valve in accordance with claim 2, wherein said seal means comprising an annular ring having a certain width through an annular side section thereof, and said groove-defining structure being annular and having a generally flat support surface adjacent the proximal portion, the support surface having a width generally the same as said certain width.

4. The check valve in accordance with claim 1, said distal portion being generally conically shaped.

5. The check valve in accordance with claim 1, the included acute angle between said seat and the centerline of the passageway being less than the included angle between the centerline of the piston and the oblique seal support surface of said proximal portion.

6. The check valve in accordance with claim 1, said distal portion being generally conically shaped with the included acute angle between the centerline of the piston and the outermost surface of the distal portion being generally the same as the included acute angle between the seat surface and the centerline of the passageway.

7. The check valve in accordance with claim 6, the included angle between the piston centerline and the beveled surface of the distal portion being about 45°.

8. The check valve in accordance with claim 2, the included acute angle between the piston centerline and the outermost oblique surface of the proximal portion being about 60°.

9. The check valve in accordance with claim 3, said annular ring being generally flat and compressible and of a tetrafluoroethylene material.

10. The check valve in accordance with claim 1, said piston means being adapted for free-floating slidable movement within said passageway in response to a fluid bias towards or away from the seat.

11. A check valve comprising:
    an elongated housing having a seat disposed between a relatively narrow first passageway and a relatively enlarged second passageway, the seat forming a certain acute angle with the centerline of the second passageway;
    an elongated, free-floating piston slidably received within the passageway for movement towards or away from the seat in response to fluid pressure biasing the piston towards or away from the seat, the piston including
    a frusto-conical distal portion oriented towards said first passageway and dimensioned for reception within the first passageway,
    a groove defining structure circumscribing the piston adjacent the distal portion, and
    a proximal portion adjacent the groove having a relieved angular surface which forms an angle relative to the centerline of the piston greater than said certain acute angle of said seat;
    an annular, generally non-elastomeric tetrafluoroethylene seal received in the groove and including an inboard region and an outboard region,
    said groove providing support to the inboard region with the outboard region unsupported by the groove to allow an initial flexing of the outboard region of the seal upon contact with the seat when the piston is fluid biased towards the seat,
    increasing fluid pressure towards the seat causing compression of the outboard region of the seal between the seat and proximal portion.

* * * * *